Nov. 15, 1960  F. T. IRGENS ET AL  2,959,986
SPRING CLUTCH REVERSING GEAR SET
Original Filed March 15, 1951
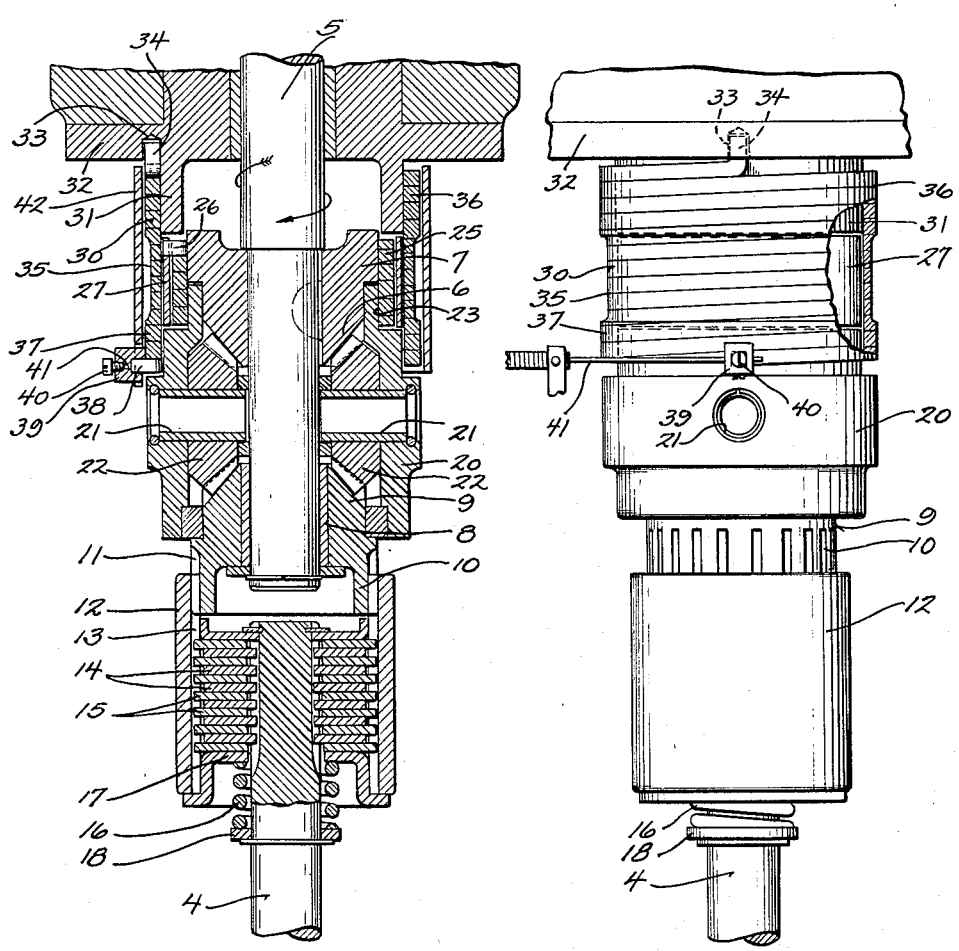
Inventors
FINN T. IRGENS
LUCIUS D. WATKINS
By
Wheeler, Wheeler & Wheeler
Attorneys

United States Patent Office 2,959,986
Patented Nov. 15, 1960

2,959,986

SPRING CLUTCH REVERSING GEAR SET

Finn T. Irgens, Milwaukee, and Lucius D. Watkins, Hartland, Wis., assignors to Outboard Marine Corporation, a corporation of Delaware Continuation of application Ser. No. 215,668, Mar. 15, 1951. This application May 4, 1956, Ser. No. 582,816

21 Claims. (Cl. 74—792)

This invention relates to a spring clutch reversing gear set.

This application is a continuation of our application 215,668, filed March 15, 1951 and now abandoned.

The device disclosed provides in exceptionally compact form a reversing gear set having forward, neutral and reverse positions completely controlled by the oscillation of the free end of a composite spring which comprises the outermost of a pair of concentric spring clutches, the composite spring having portions of different strength arranged, during the continued movement of the free end of the spring to engage and disengage related parts successively for clutch operation to control the reversing gear set.

The invention also provides, in its more generic form, a device for serially braking or clutching a plurality of rotating parts by means of a composite spring which is capable of accurately carrying out braking or clutching of the various rotating members in a predetermined sequence in response to relatively slight control movements and forces. The sequence may be stopped at any desired step, and may be resumed in either direction. In this aspect, it is not essential that a planetary gear, or any gearing, be included in the device. However, for convenience of description only, the reversing gear form of the invention will be specifically described.

While the device is illustrated, for convenience, as being installed between the crank shaft and drive shaft of an outboard motor, it will be understood that this is merely by way of exemplification, since the device is capable of general application.

In the drawings:

Fig. 1 is a view of the device in axial section.

Fig. 2 is a view of a part thereof in side elevation, an external bearing sleeve being omitted.

The reversing gear set permits the driven shaft 4 to be at rest with respect to the driving shaft 5, or to rotate either with the driving shaft 5 or in the opposite direction. The driving shaft 5 may comprise an engine crankshaft and the shaft 4 the drive shaft of a conventional outboard motor.

Keyed to the drive shaft 5 is a bevel gear 6 having a generally cylindrical hub portion 7. Rotatably mounted on bushing 8 at the lower end of shaft 5 is a similar bevel gear 9, the hub portion 10 of which has external splines at 11 through which the gear 10 may be connected with the driven shaft.

While the gear 9 may be mounted directly on the driven shaft for some purposes, it is preferred in the present invention to provide a friction clutch connection to the driven shaft which cushions shock occasioned by the reversing operation hereinafter to be described. Accordingly, the connection to the driven shaft is made through a sleeve 12 having axial channels 13 engaged by the splines 11 so that the sleeve 12 and gear 9 will rotate in unison.

Mounted on the driven shaft 4 are friction clutch disks 14 splined to the shaft and interleaved with friction clutch disks 14 peripherally engaged with the channels 13 of sleeve 12. The interleaved clutch disks are maintained under axial pressure by the spring 16 having a seat on washer 17 and exerting its upward pressure on the stamped collar 18 which supports the column of disks 14 and 15 in the manner shown. It will be apparent that sufficient driving torque will normally be transmitted from sleeve 12 to shaft 4 through the disks 15 which rotate with the sleeve and which frictionally drive the disks 14 which rotate with the shaft. However, the axial thrust of the spring 16 is so selected that the several disks 15 and 14 will slip with respect to each other in the event of excessive torque to relieve shafts 4 and 5 of overload such as might otherwise be occasioned by reversing action if gear 9 were directly connected with shaft 4.

The sleeve 20 is rotatably mounted upon the hubs of the respective gears 6 and 9. It comprises a cage which is provided with stud shafts 21 for the support of any desired number of pinions 22 meshing with bevel gears 6 and 9. Externally, the portion 23 of sleeve 20 corresponds in diameter with the cylindrical bearing surface 7 of the hub of gear 6.

The bearing surfaces 7 and 23 are encircled by a first clutch spring 25 which normally locks the sleeve 20 to the gear 7 for forward operation, it being apparent that when the cage sleeve 20 rotates with gear 7, the pinions 22 will not rotate upon their axes but will revolve with shaft 5 to maintain a direct drive to gear 9 and thence to driven shaft 4. The clutch spring 25 is contractile upon the cylindrical hub 7 of gear 6 and is so wound as to extend about this hub in the direction of rotation of shaft 5. With the direction of rotation as indicated on shaft 5, this spring will be wound lefthand. The free end of the spring 25 is turned outwardly at 26 into a notch in the operating sleeve 27 so that, by retarding the free rotation of sleeve 27, the contractile pressure of spring 25 may be relaxed to interrupt the drive through the spring from the gear hub 7 to the cage sleeve 20.

The retarding of sleeve 27 to release clutching action of spring 25 is effected by means of a control spring 30.

At its upper end, the spring 30 may be coiled about a stationary sleeve 31 such as may comprise a part of the engine crank case. For the purposes of the reversing gear set, it is also important that it be non-rotatable although in the broadest form of the invention it would be sufficient if it had rotation relative to the operating sleeve 27 such as to slow sleeve 27 to its own speed when connected to it through the control spring. Its flange 32 is notched at 33 to receive the terminal 34 of spring 30. As in the case of spring 25, the coils of spring 30 are contractile upon any cylindrical surface therein contained, in this instance, the stationary sleeve 31.

The control spring 30 has been referred to as a composite spring. By this, we mean that it has different characteristics in different portions of its length. This is represented in the present embodiment of the invention by showing the several upper coils of spring 30, those engaged with stationary sleeve 31, as having relatively heavy cross section. The intermediate portion 35 of the spring has its coils so ground peripherally as to reduce their cross section, thus making these coils materially weaker than the coils 36 of the upper portion. At the lower end of the springs, the coils 37 thereof may be comparable in strength to the coils 36. The lower extremity 38 of the spring has a suitable operating control connected therewith as, for example, the collar 39 in which a set screw 40 anchors the end of a Bowden wire 41 operable from any remote point. We may optionally guide the movement of the free lower end portion 38 of the spring by disposing the collar 39 in a notched lower end of a bearing sleeve 42, as suggested in Fig. 1, which sleeve will closely engage the outer periphery of the upper and lower portions 36 and 37 of the spring to provide external support for these spring coils, thereby keeping them properly in line, while, at the same time, guiding the relatively slight movement of the free end of the spring which is required for the operation presently to be described.

There is a very slight difference in radius between the stationary sleeve 31 with which the upper coils 36 of control spring 30 are in contractile engagement, and the slightly smaller control sleeve 27 and the peripheral surface of the cage sleeve 20. The coils 35 and 37 of control spring 30 are normally free of contact with sleeves 27 and 20, respectively.

When the wire 41 is manipulated to draw the spring terminal 38 to the left, as viewed in Fig. 2, thereby tending to tighten the spring upon the respective sleeves centered therewithin, the relatively weaker coils 35 of reduced cross section will be the first to yield. Thus the initial result of such movement of the Bowden wire 41 will be to engage coils 35 of control spring 30 with the control sleeve 27, thus arresting the movement of such sleeve.

As already noted, any retarding action exerted on the sleeve 27 will slightly expand the driving end of the clutch spring 25 whereby to release cage 20 from direct driven connection with the hub 7 of gear 6. This leaves the cage free to rotate idly between the driving gear 6 and the driven gear 9, the pinions 22 being merely rotated idly upon their respective stud shafts 21. This represents a neutral position, so far as the drive to the driven shaft 4 is concerned, and the shaft 4 may thereupon come to rest.

From this position of the parts, a reverse movement of the Bowden wire 41 will release the coils 35 of control spring 30 from the control sleeve 27 which will thereupon permit the clutch spring 25 to recouple the cage sleeve 20 with gear 6 to re-establish a direct drive connection to the driven shaft 4. If the driven shaft is subject to load at the time, shock will be absorbed by slippage between the slip clutch plates 14 and 15 until the slip clutch picks up the load without injury to the mechanism.

Assuming, however, that instead of advancing wire 41 to the right from the aforesaid neutral position, the operator draws the wire further to the left as viewed in Fig. 2, the coils 35 will be incapable of further yielding because they are now rigidly supported on sleeve 27. Accordingly, the continued movement of wire 41 to the left can only result in contracting a relatively stiffer coil 37 of the composite control spring 30 to bring these into frictional clutching engagement with the cage sleeve 20.

The cage sleeve, it will be recalled, was originally coupled through clutch spring 25 directly with the driving gear 6 on shaft 5. It was first released from such coupled engagement by the expansion of the clutch spring 25 and permitted to rotate idly. It is now, by the operation thus described, coupled with the stationary sleeve 31 which completely arrests its movement. With the cage sleeve thus stopped from rotation, the planetary gears 22 now become effective to transmit power from the driving gear 6 on shaft 5 to cause rotation of driven gear 9 and shaft 4 in reverse as compared with the direction of rotation of shaft 5. Again, the slip clutch plates 14, 15 will slip to permit the load to be picked up gradually and to spare the parts from destructive shock.

Movement of wire 41 to the right as viewed in Fig. 2 will reverse the sequence of operations so that the clutch mechanism will move from reverse position to neutral and then to forward position. In these movements, the sequence is controlled by the relatively stronger and weaker coils of the control spring 30. The stronger coils 37 are the last to yield to the pull of Bowden wire 41 and the first to react to normal position when the pull of the Bowden wire is relaxed. The relatively weaker coils 35 are the first to respond to the tensioning movement of the Bowden wire 41 and the last to relax when the wire is extended.

It is obviously immaterial exactly what manually operable mechanism is used to tension and release the control spring 30, and also immaterial whether such mechanism is attached directly to the spring, or whether the guiding sleeve 42 is used. It is likewise broadly immaterial what means is used for weakening the other coils of the composite spring, the expedient of reducing their cross section being the simplest and best means presently known to me for accomplishing this purpose.

Since the only work required of the operator is to tension and release the control spring 30, and since remarkably little power is required for this purpose, the reversing mechanism disclosed is not only exceptionally simple, compact and inexpensive, but is exceptionally easily operated, and may be controlled from a remote point with a minimum of intervening actuating devices, a simple Bowden wire sufficing.

While the slip clutch is no essential part of the reversing mechanism, it will be observed that its structure is compactly and conveniently correlated with the reversing gear set to provide a coupling between the driven pinion 9 and the driven shaft 4 which not only transmits motion and permits of a certain degree of universal action, but also absorbs shock by limiting torque transmission to a value which the parts can accept without damage.

Other devices may be controlled by utilizing the principles of this invention, and other sequences of operation may be achieved by varying the strength of various sections of the control spring. Likewise the number of relatively rotatable parts that may be controlled is dependent on the qualities of the control spring.

We claim:

1. The combination with relatively rotatable axially aligned driving and driven elements having adjacent bearing surfaces which are generally cylindrical and of substantially like radius, of a motion transmitting connection from the driving element to the driven element comprising a contractile spring encircling the said surfaces and helically wound in a direction to be contracted by the driving force, whereby resistance to the rotation of said spring exerted on the end thereof engaged with the driving element will expand its coils to release such driving element, a cylindrical sleeve connected with the end portion of the spring carried by the driving element, and a releasable friction brake device for acting upon said sleeve in opposition to its normal rotation with the driving element and said spring, said brake device comprising a second spring having one end provided with a fixed anchorage and having intermediate coils encircling said sleeve and normally free thereof, the last mentioned spring having a free end and control means for moving its free end in directions to contract and expand the said intermediate coils to and from engagement with said sleeve, said driven element having an additional bearing surface disposed axially more remote from the driving element than said first mentioned bearing surfaces and which has a radius substantially equal to the radius of said sleeve, said second spring having terminal coils between said intermediate coils and said free end which encircle said additional bearing surface, whereby movement of said free end will contract and expand said terminal coils about said additional bearing surface and brake said driven element.

2. The device of claim 1 in which said intermediate coils of said second spring are weaker than said terminal coils, whereby said intermediate coils will contract sooner and expand later than said terminal coils upon movement of said free end.

3. In a transmission, coaxial driving and driven elements having portions of like diameter, a clutch spring encircling said portions of said elements and contractile to engage said portions and wound in the direction of driving element rotation to relax its contractile engagement with the driving element if rotation of the spring encircling said driving element portion meets with resistance, a sleeve embracing the spring and having connection with the end thereof which encircles the driving element, a fixed sleeve of diameter substantially corresponding to that of the sleeve just mentioned, a second clutch spring encircling and contractilly engaging said sleeves, and means effective during continued rotation of the driving element in one direction for expanding and contracting said second clutch spring to engage and release the first sleeve for the release and engagement of the first clutch spring to control the drive from the driving to the driven element.

4. In a transmission, the combination with three substantially coaxial elements which have peripheral portions of substantially like radius, of a clutch spring having an anchorage on one of said elements and encircling the several elements in contractile bias toward said peripheral portions, and means for effecting the unwrapping of portions of said spring successively from two of said elements for successively declutching the spring therefrom, said spring tending to reengage said two elements in reverse order when released by said means.

5. The device of claim 4 in which said spring has coil portions of less bias than other coil portions to predetermine the sequence of spring engagement with and release of said two elements.

6. A plurality of coaxial relatively rotatable members with cylindrical surfaces of approximately equal radii, and means engageable sequentially with said members for torque transmission therebetween and comprising a helical spring having coils concentric with said members, certain of said coils being of different torque resisting capacity than the remainder of said coils, whereby to preselect the order in which said coils respond to the application of torque by changing their radii to engage or disengage said members, and a means other than said members for applying torque to the coils of said spring, one of said members being a sleeve in further combination with a second helical spring concentric with said sleeve, said sleeve being connected to one end of said second spring, and a driving member and a driven member adapted to be coupled by said second spring.

7. The device of claim 6 in which said device is mounted on a frame, and a second of said relatively rotatable members is fixed with respect to said frame whereby when said first spring is engaged with said sleeve and said member fixed to the frame, a torque is applied to said sleeve tending to fix it with respect to the frame.

8. The device of claim 7 in which said second spring is fixed at one end to the driven member, and is wound in such a direction that said torque tends to uncouple said driving and driven members.

9. The device of claim 8 in which the driving member is the driving gear of a planetary gear set having a cage and planetary pinions connected for rotation therewith and meshing with the driving gear and the driven member is a cylindrical surface of the cage of said planetary gear set, the engagement of the spring resulting in opposition to relative movement between the driving gear and cage.

10. The device of claim 9 in which said cage has a second cylindrical surface comprising one of said relatively rotatable members, said sleeve being axially between said second cylindrical surface of the cage and said member fixed with respect to the frame, the coils of the first helical spring being of reduced torque resisting capacity adjacent said sleeve, and of normal torque resisting capacity adjacent said second cylindrical cage surface, whereby said cage will be engaged by said first spring after said sleeve is so engaged, and disengaged before said sleeve.

11. In combination, a fixed cylindrical member, a driving member and a driven member, said driving and driven members being coupled by a helical clutch spring having a free end in pressure engagement peripherally with the driven member, said helical spring being coiled in a direction such that its engagement pressure will be decreased by torque applied in a direction opposite to the rotation of the driving member, a control sleeve concentric with said spring and fastened to the other end thereof, and a control helical spring encircling said fixed cylindrical member, said control sleeve, and said driven member.

12. In combination, a fixed cylindrical member, a driving member and a driven member, said driving and driven members being coupled by a helical clutch spring having a free end in pressure engagement peripherally with the driven member, said helical spring being coiled in a direction such that its engagement pressure will be decreased by torque applied in a direction opposite to the rotation of the driving member, a control sleeve concentric with said spring and fastened to the other end thereof, and a control helical spring encircling said fixed cylindrical member, said control sleeve, and said driven member, the control spring having coils of different strengths encircling the control sleeve and the driven member respectively.

13. The device of claim 12 in which the coils encircling the control sleeve are weaker than those encircling said driven member.

14. The device of claim 11 in which there is a second driven member adapted to be driven when said first driven member is held stationary by said control spring.

15. The device of claim 14 in which the driving member is the driving bevel gear of a planetary gear set having a driven bevel gear, a cage, and planetary pinions connected for rotation with the cage and meshing with the driving and driven gears, the first driven member is the cage of said planetary gear set, and the second driven member is the driven bevel gear of said planetary gear set, thee engagement of the spring resulting in opposition to relative movement between the driving and driven gears and cage.

16. The device of claim 15 in which the coils of the control spring encircling the control sleeve are weaker than the coils of the control spring encircling said cage, whereby an initial movement of the free end of the control spring will contract said weaker coils, brake the control sleeve, and release the driving gear from the cage, and further movement of said free end will contract the stronger coils, braking the cage and permitting the driven bevel gear to be driven in reverse through the planet gear of the planetary gear set, said control sequence being reversed upon a return movement of the free end of the control spring.

17. In a device having at least three relatively rotatable members to be operatively connected to one another in a preselected sequence, the combination with said members of means for sequentially engaging said members and comprising a helical spring having sections which have predetermined differing ability to resist a change in radius produced by the application of torque to said spring, said spring being concentric with said members.

18. A transmission having forward, neutral, and reverse settings successively made by unidirectional movement of a control, said transmission comprising in combination aligned driving and driven shafts; a planetary gear set having sun gear teeth connected with said shafts, pinions meshing with said sun gear teeth, and a cage mounted for rotation coaxially with said shafts and provided with means for mounting said pinions, one of the shafts and said cage having registering generally cylindrical surfaces of substantially like radius; a clutch spring encircling said surfaces and having coils contractile upon said surfaces and wound in a direction to be tightened thereon by torque between said surfaces; a first sleeve connected with that end of the spring which encircles the cylindrical surface in which such torque originates; a stationary sleeve coaxial with the first sleeve, said sleeves having generally cylindrical surfaces and the said cage having a generally cylindrical surface coaxial with said sleeves and the said surfaces of the stationary sleeve, the first sleeve and the cage being arranged in series; and a second spring encircling the said cylindrical surfaces in series and having control means connected to an end thereof remote from the stationary sleeve and movable in directions to tighten said second spring upon and release it from said surfaces successively, the said surface of the cage being the last upon which the second spring is tightened in the tightening direction of control means movement and the first from which the second spring is released in the releasing movement of said means, whereby said control means is effective on the first spring to relieve it of clutching connection to the cage and thereby to allow the cage to rotate idly in an intermediate position of the control means, the cage being clutched to establish a forward drive to the driven shaft when the second spring engages the stationary sleeve only and being free of both shafts and clutched to the stationary sleeve to establish reverse drive to the driven shaft when the second spring engages the said cage surface.

19. The device of claim 18 in which the second spring has coils contractile upon said cylindrical surfaces and has portions intermediate its ends which are of reduced bias as compared with other portions, whereby to predetermine the sequence of engagement and release of said aligned cylindrical surfaces.

20. The device of claim 19 in which the control means comprises an outer sleeve operatively mounted for rotation about the second spring and connected with the end thereof remote from said stationary sleeve and having a remotely operable connection for effecting outer sleeve rotation.

21. A transmission comprising the combination with a stationary sleeve and a substantially coaxial driving shaft projecting from said stationary sleeve; of a driven shaft aligned with the driving shaft; a planetary transmission coupling said shafts and comprising a first sun gear on the driving shaft, a second sun gear on the driven shaft, planet pinions meshing with said gears, and a cage rotatable coaxially with said shafts and provided with means for mounting the pinions; a clutch spring having coils contractile about the driving shaft sun gear and the cage and wound in a direction to be tightened by torque between the sun gear and cage, the driving shaft sun gear having a generally cylindrical surface and the cage having an adjacent portion of substantially like radius, a rotatable sleeve coaxial with the clutch spring and so connected with the clutch spring as to tend to relax the contractile bias of the spring if rotation of the rotatable sleeve is arrested; a control spring having coils contractilly engaged with the stationary sleeve and having coils of lesser bias contractile toward the rotatable sleeve and having coils of greater bias than the last mentioned coils and contractile toward the cage, said cage and sleeves having surfaces in substantial alignment; and a control means oscillatable about the axis of said shafts and connected with the end of the control spring remote from the stationary sleeve for successive engagement of said control spring with said rotatable sleeve and cage in one direction of control means oscillation and successive release of said cage and rotatable sleeve by the control spring in an opposite direction of control means oscillation, whereby said transmission has direct drive neutral and reverse drive controlled in the unidirectional operation of the control means.

References Cited in the file of this patent

UNITED STATES PATENTS

| | | |
|---|---|---|
| 1,983,824 | Starkey | Dec. 11, 1934 |
| 2,004,650 | Collyear | June 11, 1935 |
| 2,055,068 | Drexler | Sept. 22, 1936 |
| 2,358,746 | Tandler et al. | Sept. 19, 1944 |
| 2,575,012 | Harvey | Nov. 13, 1951 |
| 2,653,489 | Charpentier | Sept. 29, 1953 |
| 2,726,558 | Geldhof et al. | Dec. 13, 1955 |
| 2,771,795 | Orr | Nov. 27, 1956 |

FOREIGN PATENTS

| | | |
|---|---|---|
| 386,358 | Great Britain | Jan. 19, 1933 |